(12) United States Patent
Kurahashi et al.

(10) Patent No.: US 6,947,115 B2
(45) Date of Patent: Sep. 20, 2005

(54) LIQUID CRYSTAL DISPLAY DEVICE

(75) Inventors: Nagatoshi Kurahashi, Mobara (JP); Yoshiaki Nakayoshi, Ooamishirasato (JP); Kazuhiko Yanagawa, Mobara (JP)

(73) Assignee: Hitachi Displays, Ltd., Mobara (JP)

( * ) Notice: Subject to any disclaimer, the term of this patent is extended or adjusted under 35 U.S.C. 154(b) by 131 days.

(21) Appl. No.: 10/392,899

(22) Filed: Mar. 21, 2003

(65) Prior Publication Data

US 2003/0179331 A1 Sep. 25, 2003

(30) Foreign Application Priority Data

Mar. 22, 2002 (JP) ........................................ 2002-080876

(51) Int. Cl.⁷ ...................... G02F 1/1333; G02F 1/1343
(52) U.S. Cl. ...................................... 349/138; 349/141
(58) Field of Search .............................. 349/138, 141, 349/139, 38

(56) References Cited

U.S. PATENT DOCUMENTS 6,404,475 B1 * 6/2002 Nakayoshi et al. ......... 349/141
6,747,722 B2 * 6/2004 Ono et al. ................... 349/141
6,816,221 B2 * 11/2004 Oke et al. ................... 349/141

FOREIGN PATENT DOCUMENTS

| JP | 10-186407 A | 7/1988 |
| JP | 2000-089240 | 3/2000 |

* cited by examiner

Primary Examiner—Robert H. Kim
Assistant Examiner—David Y. Chung
(74) Attorney, Agent, or Firm—Antonelli, Terry, Stout & Kraus, LLP

(57) ABSTRACT

A liquid crystal display device has pixel electrodes and counter electrodes formed on the same substrate, and at least one of the counter electrodes overlaps with a video signal line and a gate signal line with a dielectric film being interposed therebetween. The dielectric film is formed of a sequential lamination of at least a protective film made of an inorganic material and a protective film made of an organic material, and an opening is formed at a part of the protective film made of the inorganic material at a position underlying the counter electrode. This opening is filled with the protective film made of the organic material.

20 Claims, 12 Drawing Sheets

LIQUID CRYSTAL DISPLAY DEVICE

BACKGROUND OF THE INVENTION

The present invention relates generally to liquid crystal display devices; and, more particularly, the invention relates to a liquid crystal display device of the type employing the so-called lateral electric field scheme.

A liquid crystal display device of the so-called lateral electric field type is constructed so that a picture element, or "pixel", electrode and an opposite, or "counter", electrode are arranged to provide for creation of a generally horizontal electric field between this pixel electrode and the counter electrode in a pixel region on the liquid crystal-side surface of one substrate of a pair of substrates, which are disposed to oppose each other with a layer of liquid crystal material interposed therebetween. Thus, the liquid crystals are driven by certain components of the electric field which extend almost in parallel with the substrate.

One example of such an arrangement, as applied to an active matrix type device, is designed to provide as the pixel regions respective regions which are surrounded by a plurality of parallel-provided gate signal lines on or over the liquid crystal-side surface of one substrate and a plurality of drain signal lines that are provided in parallel in such a way as to cross or intersect these respective gate signal lines on the substrate. Within each of these pixel regions, there are a thin-film transistor, which is operative in response to a scanning signal received from a gate signal line, the pixel electrode to which an image or video signal is supplied through this thin-film transistor from a drain signal line, and the counter electrode to which a signal for use as a reference with respect to the image signal is supplied.

The pixel electrode and the counter electrode are each formed as a band-like or strip-shaped pattern which extends in one direction, wherein each of these electrodes is ordinarily arranged to be formed of two or more components, which are alternately disposed.

In this arrangement, the counter electrode is formed on or above the upper surface of a dielectric film, that is formed to also cover its associated drain signal line, while the center axis of the counter electrode is arranged to substantially coincide with the center axis of the drain signal line, although it has a greater width than that of the drain signal line. The purpose of this arranged of elements is to cause an electric flux line from the drain signal line to easily terminate at its overlying counter electrode, to thereby prevent termination at the pixel electrode. If the arrangement is otherwise, the electric flux line terminates at the pixel electrode, with the result that there will be an unwanted production of noise.

The counter electrode described above is formed at the upper surface of a dielectric film that is formed to cover the gate signal line also in such a manner that the counter electrode is integral with the counter voltage signal line, wherein a reference signal is to be supplied to each counter electrode through this counter voltage signal line.

SUMMARY OF THE INVENTION

However, it has been determined that a liquid crystal display device that is arranged in the way described above suffers from generation of a parasitic capacitance between the gate signal line and the counter voltage signal line, which parasitic capacitance results in the occurrence of waveform delays of the scan signal which is supplied to the gate signal line.

In recent years, since the gate signal line has tended to become larger in length with an increase in the size of liquid crystal display devices, it has become an important goal to reduce the waveform delays of the scan signal.

The present invention has been made in view of the above-mentioned technical background, and an object of the present patent application is to provide a liquid crystal display device in which waveform delays of scan signals being supplied to the gate signal lines are reduced.

Another object of this invention is to provide a liquid crystal display device in which waveform delays of image signals supplied to drain signal lines are suppressed.

A brief explanation will be given of representative ones of the inventive concepts of the present invention in the following description.

(1) A liquid crystal display device is constructed such that a first substrate and a second substrate are joined with a liquid crystal layer being disposed therebetween. A plurality of gate signal lines are formed on a first substrate, and a plurality of drain signal lines are also formed on the first substrate so as to intersect with the plurality of gate signal lines. A plurality of switching elements are operable in response to a scan signal from a gate signal line, so that an image signal is supplied to a pixel electrode through the switching element from a drain signal line in each of the pixels. At least one counter electrode is provided for creating an electric field with the pixel electrode in each of the pixels, and this counter electrode is arranged along a running direction of a drain signal line and overlaps with the drain signal line, with a dielectric film being disposed therebetween. At least one other counter electrode, or counter voltage signal line integrated with the counter electrode, is arranged along a running direction of the gate signal line and overlaps with the gate signal line, with the dielectric film being disposed therebetween. This dielectric film is comprised of a sequential lamination of at least a protective film made of an inorganic material and a protective film made of an organic material, wherein an opening is formed at a part of the protective film made of the inorganic material, underlying at least either one of said counter voltage signal line and said counter electrode, the opening being filled with the protective film made of the organic material.

(2) A liquid crystal display device is constructed such that a first substrate and a second substrate are joined with a liquid crystal layer being disposed therebetween. A plurality of gate signal lines are formed on a first substrate, and a plurality of drain signal lines are also formed on the first substrate so as to intersect with the plurality of gate signal lines. A plurality of switching elements are operable in response to a scan signal from a gate signal line, so that an image signal is supplied to a pixel electrode through the switching element from a drain signal line in each of the pixels. At least one counter electrode is provided for creating an electric field with the pixel electrode in each of the pixels, and this counter electrode is arranged along a running direction of a drain signal line and overlaps with the drain signal line, with a dielectric film being disposed therebetween. At least one other counter electrode, or counter voltage signal line integrated with the counter electrode, is arranged along a running direction of the gate signal line and overlaps with the gate signal line, with the dielectric film being disposed therebetween. This dielectric film is constituted from a sequential lamination of a first protective film and a second protective film, which overlap to said first protective film and is lower in dielectric constant than said first protective film, wherein an opening is formed at a part of said first protective film underlying at least either one of said counter voltage signal line and said counter electrode, said opening being filled with said second protective film.

(3) A liquid crystal display device is constructed such that a first substrate and second substrate are joined with a liquid crystal layer being disposed therebetween. A plurality of gate signal lines are formed on a first substrate, and a plurality of drain signal lines are also formed on the first substrate so as to intersect with the plurality of gate signal lines. A plurality of switching elements are operable in response to a scan signal from a gate signal line, so that an image signal is supplied to a pixel electrode through the switching element from a drain signal line in each of the pixels. At least a counter electrode is provided for creating an electric field with the pixel electrode in each of the pixels, and this counter electrode is arranged along a running direction of a drain signal line and overlaps with the drain signal line, with a dielectric film being disposed therebetween. At least one of said counter electrode, or counter voltage signal line integrated with the counter electrode, is arranged along a running direction of said gate signal line and overlaps with the gate signal line, with the dielectric film being disposed therebetween. An opening is made in one of said counter voltage signal line and the counter electrode, and said an opening is arranged to partially overlap with the gate signal line.

BRIEF DESCRIPTION OF THE DRAWINGS

FIGS. 1A to 1C are diagrams showing an arrangement of one embodiment of a pixel of a liquid crystal display device in accordance with the present invention, wherein FIGS. 1B and 1C are selected views taken along lines b—b and c—c, respectively, in FIG. 1A.

FIGS. 5A–5C are diagrams showing the configuration of another embodiment of the pixel of the liquid crystal display device in accordance with the invention, wherein FIGS. 5B and 5C are sectional views taken along lines b—b and c—c, respectively, in FIG. 5A.

FIGS. 6A and 6B are diagrams showing the configuration of another embodiment of the pixel of the liquid crystal display device in accordance with the invention, wherein FIG. 6B is a section view taken along line b—b in FIG. 6A.

FIGS. 9A and 9B are diagrams showing the configuration of another embodiment of the pixel of the liquid crystal display device in accordance with the invention, wherein FIG. 9B is a sectional view taken along lines b—b in FIG. 9.

FIGS. 12A–12C are diagrams showing the configuration of another embodiment of the pixel of the liquid crystal display device in accordance with the invention, wherein FIGS. 12B and 12C are sectional views taken along lines b—b and c—c, respectively, in FIG. 12A.

FIGS. 15A–15B are diagrams showing the configuration of another embodiment of the pixel of the liquid crystal display device in accordance with the invention, wherein FIG. 15B is a sectional view taken along lines b—b in FIG. 15A.

FIGS. 16A–16B are diagrams showing the configuration of another embodiment of the pixel of the liquid crystal display device in accordance with the invention, wherein FIG. 16B is a sectional view taken along line b—b in FIG. 16A.

DETAILED DESCRIPTION

Several preferred embodiments of the liquid crystal display device in accordance with the present invention will be described with reference to the accompanying drawings.

Embodiment 1

Overall Arrangement

Figure 2A:
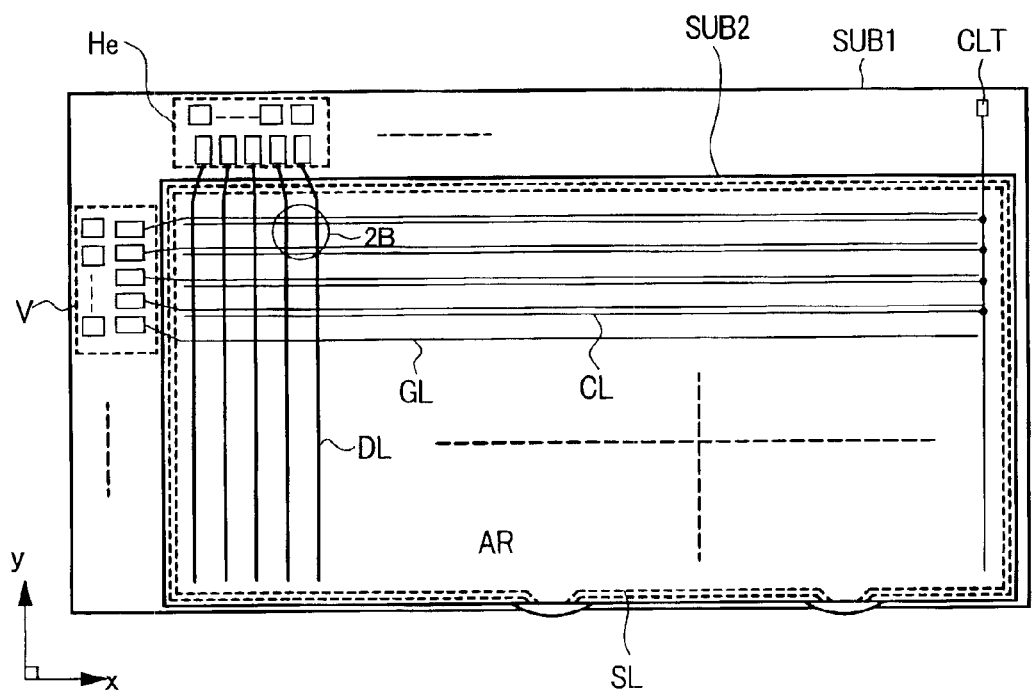
FIG. 2A is a diagram showing the configuration of one embodiment of the liquid crystal display device in accordance with this invention.

FIG. 2A is a diagram showing one embodiment of the liquid crystal display device in accordance with this invention. Although FIG. 2A is an equivalent circuit diagram, this diagram illustrates the structural arrangement of the device in a way corresponding to the real geometrical layout of the elements thereof.

In FIG. 2A, a pair of transparent substrates SUB1, SUB2 are provided, which substrates are disposed to spatially oppose each other with a layer of liquid crystal material being interposed therebetween. The liquid crystal material is sealed therein by a sealing material SL, which functions also to fix one transparent substrate SUB1 is position with respect to the other transparent substrate SUB2.

Gate signal lines GL, which extend in the "x" direction thereof and are provided in parallel in a "y" direction, and drain signal lines DL, which extend in the y direction and are parallel-provided in the x direction, are formed on or above the liquid crystal-side surface of the above-noted one transparent substrate SUB1. Regions surrounded by the respective gate signal lines GL and respective drain signal lines DL constitute pixel regions; whereby, a matrix-like ensemble or assembly of these respective pixel regions makes up a liquid crystal display unit AR.

In addition, in respective ones of those pixel regions that are parallel-provided in the "x" direction, a common counter voltage signal line CL is formed, which is designed to run within each of such pixel regions. This counter voltage signal line CL is used as a signal line for supplying a voltage, for use as a reference with respect to image or video signals to a counter electrode CT of each of the pixel regions as will be described later.

Figure 2B:
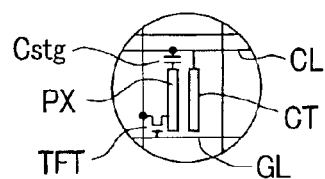
FIG. 2B is a schematic circuit diagram of one pixel which appears in the region 2B of FIG. 2A.

In each pixel region, as seen in FIG. 2B, there is a thin-film transistor TFT, which is made operative in response to a scanning signal incoming from a gate signal line GL on its one side, and a pixel electrode PX, to which an image signal is supplied through this thin-film transistor TFT from a one-side drain signal line DL. This pixel electrode PX is arranged to cause an electric field to be generated between itself and the counter electrode CT, that is connected to the counter voltage signal line CL, wherein this electric field is used to control the optical transmissivity of the liquid crystal material adjacent thereto.

One end of each gate signal line GL is extended to go beyond the seal material SL, and the extended end constitutes a terminal to which an output terminal of a vertical scan driving circuit V is connected. Additionally, an input terminal of the vertical scan drive circuit V receives a signal from a printed wiring board, which is externally provided on the outer side of a liquid crystal display panel. The vertical scan drive circuit V is made up of a plurality of semiconductor devices, wherein a plurality of mutually neighboring gate signal lines GL are grouped together with a single semiconductor device being assigned thereto on a per-group basis.

Similarly, one end of each drain signal line DL is extended beyond the seal material SL, wherein such extended end constitutes a terminal to which an output terminal of an image/video signal driving circuit He is connected. Additionally, an input terminal of the image signal drive circuit He receives a signal from a printed wiring board that is disposed outside the liquid crystal display panel. This image signal drive circuit He also is made up of a plurality of semiconductor devices, wherein a plurality of mutually neighboring drain signal lines DL are grouped together, with a single semiconductor device being assigned thereto on a per-group basis.

Note that the counter voltage signal lines CL are commonly connected together at their end portions on the right side in FIG. 2A. A connection line thereof is extended beyond the seal material SL and thus constitutes a terminal CLT at its extended end. From this terminal CLT, a voltage, which becomes a reference with respect to an image signal (s), is supplied.

Each of the above-noted gate signal lines GL is arranged so that one of them is sequentially selected by a scan signal from the vertical scan circuit V. The drain signal lines DL are arranged so that an image signal is supplied by the image signal drive circuit He to a respective one of these lines at a timing that is synchronized with the selection timing of the gate signal line GL.

It should be noted that, in the above-stated embodiment, although the vertical scan drive circuit V and the image signal drive circuit He are shown as semiconductor devices which are mounted on the transparent substrate SUB1, alternative arrangements are also possible; for example, semiconductor devices of the so-called tape carrier type are also employable, which are connected in such a manner as to bridge between the transparent substrate SUB1 and the printed wiring board. Furthermore, in the case where the semiconductor layer of the thin-film transistor TFT discussed above is made of polycrystalline silicon (p-Si), more than one semiconductor element made of the polysilicon may be formed on the transparent substrate SUB1's surface together with a wiring layer(s) associated therewith.

Pixel Arrangement

Figure 1A:
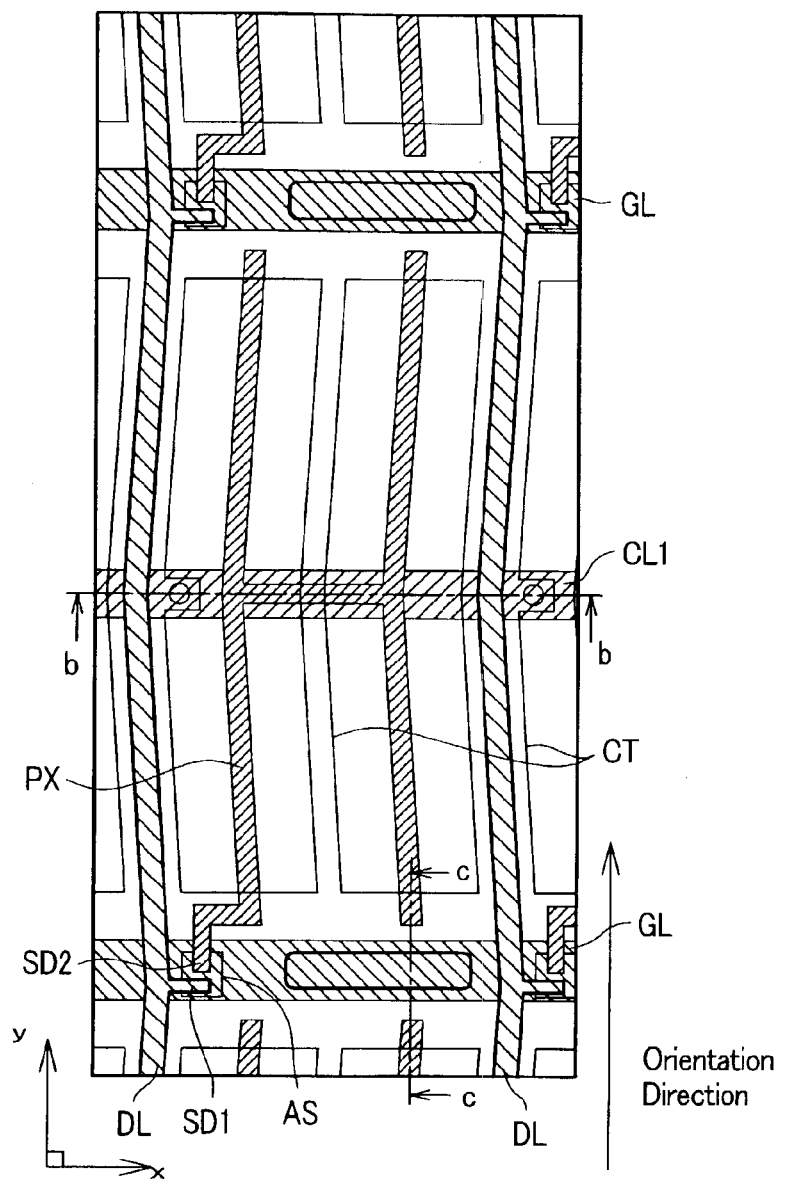
Figure 1B:
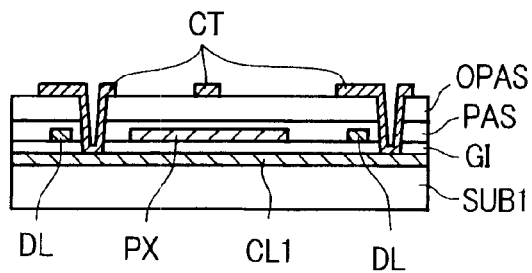
Figure 1C:
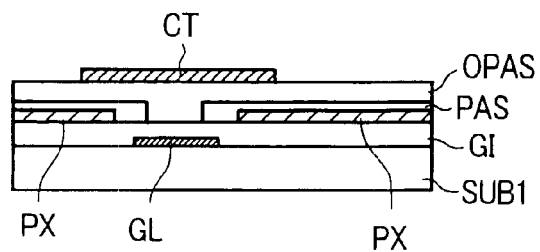

FIGS. 1A to 1C depict one embodiment of an arrangement of the pixel region described above, wherein FIG. 1A is a plan view, FIG. 1B shows a cross-sectional view taken along line b—b of FIG. 1A, and FIG. 1C shows a sectional view along line c—c of FIG. 1A.

In each figure of the drawing, a pair of gate signal lines GL, which extend in the x direction and are parallel-provided in the y direction, are first formed on the liquid crystal-side surface of the transparent substrate SUB1. These gate signal lines GL are arranged to define a rectangular area together with a pair of drain signal lines DL, which will be described later. This area represents a single pixel region.

In addition, at the center of the respective gate signal lines GL, a counter voltage signal line CL1 is formed in such a manner as to run in parallel with the gate signal lines GL. For example, this counter voltage signal line CL1 is formed simultaneously during fabrication of the gate signal lines GL.

On the surface of the transparent substrate SUB1, with the gate signal lines GL and counter voltage signal line CL1 formed thereon in this way, a dielectric film GI, which is made, for example, of $SiO_2$, is formed to also cover or coat the gate signal lines GL and others. This dielectric film GI functions as an interlayer dielectric film with respect to the gate signal lines GL and the counter voltage signal line CL1 in a region of the drain signal lines DL, to be later described, and also, in a region of thin-film transistors TFT, to be later described, it serves as the gate insulation film thereof.

A semiconductor layer AS, which is made for example of amorphous S1, is formed at a surface of this dielectric film GI in such a manner as to partially overlie and overlap the gate signal lines GL. This semiconductor layer AS is part of a thin-film transistor TFT, and it is possible, by forming a drain electrode SD1 and a source electrode SD2 above its upper surface, to form a metal insulator semiconductor (MIS) transistor of the inverse stagger structure type, with part of a gate signal line being used as its gate electrode. Here, the drain electrode SD1 and the source electrode SD2 are arranged so that they are formed simultaneously upon formation of the drain signal lines DL.

More specifically, drain signal lines DL, which extend in the y direction and are parallel-provided in the x direction, are formed, so that a part thereof extends up to the upper surface of the semiconductor layer AS, to thereby form the drain electrode SD1; and, additionally, the source electrode SD2 is formed while being spaced apart from this drain electrode SD1 by a distance equivalent to the channel length of the thin-film transistor TFT.

In addition, this source electrode SD2 is formed so as to be integral with a pixel electrode PX to be formed within the pixel region. More specifically, the pixel electrode PX is constituted from a group of a plurality of (two in the drawing) electrodes which extend in the y direction within the pixel region and are parallel-provided in the x direction. One end of a single pixel electrode PX functions also as the source electrode SD2; and, additionally, over the counter voltage signal line CL at an almost central portion thereof, a portion of the pixel electrode is arranged to achieve mutual electrical connection to a corresponding portion of another pixel electrode PX which is adjacent thereto.

A protective film is formed above the surface of the transparent substrate SUB1 with the thin-film transistor TFT, drain signal lines DL, drain electrode SD1, source electrode SD2 and pixel electrode PX formed thereon, in the way discussed above. This protective film precludes direct contact of the thin-film transistor TFT with the liquid crystal material to thereby prevent degradation of the characteristics of such a thin-film transistor TFT.

It should be noted that this protective film is comprised of a sequential lamination of a protective film PAS, that is formed of an inorganic material layer, such as SiN, for example, and a protective film OPAS, that is formed of an organic material layer, such as a resin or the like. The use of at least the organic material layer as a protective film is aimed at reduction of the dielectric constant of the protective film per se. Thus, an effect or effects may be achieved by providing the sequential lamination of the first protective film and second protective film and also by providing the second protective film using materials having a lower dielectric constant than that of the first protective film.

Here, in the protective film PAS to be formed over the gate signal lines GL, more than one opening is formed at a portion(s) thereof, while letting the protective film OPAS be stacked or multilayered in such a way as to bury or fill this opening. The function of the opening as formed in the protective film PAS will be explained later. In this case, in view of the fact that the dielectric film GI is made of $SiO_2$, by way of example, this film is expected to function as a stopper during hole formation of the protective film PAS.

A counter electrode CT is formed on an upper surface of the protective film OPAS. This counter electrode CT is constituted from a group of (for example, three in the drawing) electrodes which extend in the y direction and are parallel-provided in the x direction in a similar manner to that of the pixel electrode PX described previously, wherein each of these electrodes is laid out so that a pixel electrode PX is placed between adjacent counter electrodes, as seen when planarly looking at the layout pattern in FIG. 1A.

More specifically, the counter electrodes CT and pixel electrodes PX are spaced by equal distances in the order of a counter electrode CT, pixel electrode PX, counter electrode CT, pixel electrode PX, . . . , counter electrode CT in a range spanning from a drain signal line DL on one side, up to a drain signal line DL on the other side of the pixel region.

Here, the counter electrodes CT, that are positioned on both sides of the pixel region, are arranged such that a portion thereof is formed to overlap a drain signal line DL, and, simultaneously they operate in common as a corresponding counter electrode CT of a neighboring pixel region. In other words, a counter electrode CT is caused to overlie a drain signal line DL in such a way that their center axes are substantially identical to each other, while the width of the counter electrode CT is formed to be greater than that of the drain signal line DL. A portion of the counter electrode CT on the left side of the drain signal line DL is arranged to constitute the counter electrode CT of a left-side pixel region; while, a portion of the counter electrode CT on the right side makes up the counter electrode CT of the pixel region on the right side of the drain signal line DL.

By forming the counter electrode CT to have a greater width than that of the drain signal line DL, so that parts thereof overly the drain signal line DL in this way, an effect is attained which affords the capability to preclude unwanted termination of electric flux lines from the drain signal line DL at the counter electrode CT and also termination at the pixel electrode PX. The reason for this is as follows: if the electric flux lines from the drain signal line DL are terminated at the pixel electrode PX, this would result in the generation of noises.

Each counter electrode CT, which is made up of multiple components, is formed integrally with a material layer which is in the same layer and is made of the same material and is formed to sufficiently cover the gate signal lines GL. Here, the material layer to be formed integrally with the counter electrode CT is formed of an optically transparent conductive layer made of indium tin oxide (ITO), indium tin zinc oxide (ITZO), indium zinc oxide (ISO), tin oxide ($SnO_2$), indium oxide ($In_2O_3$), or other similar suitable materials.

Since the counter electrode CT, which is comprised of these materials and the material layer formed integrally therewith, have a relatively large electrical resistance, they employ the aforementioned pattern, while at the same time permitting electrical connection to the counter voltage signal line CL1 via more than one through-hole to be formed to penetrate the protective film OPAS, the protective film PAS and the dielectric film GI. A reference signal is supplied to each counter electrode CT through the counter voltage signal line CL1.

It should be noted that a portion of the material layer to be formed integrally with the each counter electrode CT, while sufficiently covering the gate signal line GL, will be referred to as the counter voltage signal line CL hereinafter. This portion functions as a signal line that is used to supply the reference signal to the counter electrodes CT, together with the counter voltage signal line CL, which is formed at the same layer as the gate signal lines GL.

Here, more than one opening is formed at part of the protective film PAS that was formed over the gate signal lines GL in the way stated above, wherein the material layer integral with the counter electrode CT is formed above the upper surface of the protective film OPAS, which is made of an organic material layer and is formed in such a manner as to bury this opening.

More specifically, no portion of the protective film PAS, which is formed of an inorganic material layer, exists between the material layer integral with the counter electrode CT and the gate signal line(s) GL; thus, where a portion of the PAS film is expected to exist, the protective film OPAS, which is comprised of the organic material layer, has an increased film thickness, with the thickness of the PAS film at the location being added thereto. Due to this, a parasitic capacitance Cgs, which exists between a gate signal line GL and a counter electrode CT, decreases in value, which in turn produces the effect of reducing waveform delays of a scan signal being supplied to the gate signal line GL.

The material layer which is formed to sufficiently cover the gate signal lines GL is arranged such that the end portion of each pixel electrode PX is positioned so as to stop short of and be spaced from the gate signal line GL, whereby a capacitive element Cstg is formed between the pixel electrode PX and the counter electrode CT, with the protective film PAS and the protective film OPAS serving as the dielectric film thereof. This capacitive element Cstg is designed to have the function of allowing an image signal, that is supplied to the pixel electrode PX, to be stored or accumulated therein for a relatively long time period.

Over the upper surface of the transparent substrate SUB1, which has the counter electrodes CT formed thereon in this way, an optical orientation or alignment film (not shown) is formed in such a manner as to cover the counter electrodes CT also. This alignment film is a film that is in direct contact with the liquid crystal material, wherein rubbing formed on its surface is used to determine the initial alignment directions of liquid crystal molecules.

Embodiment 2

Figure 3:
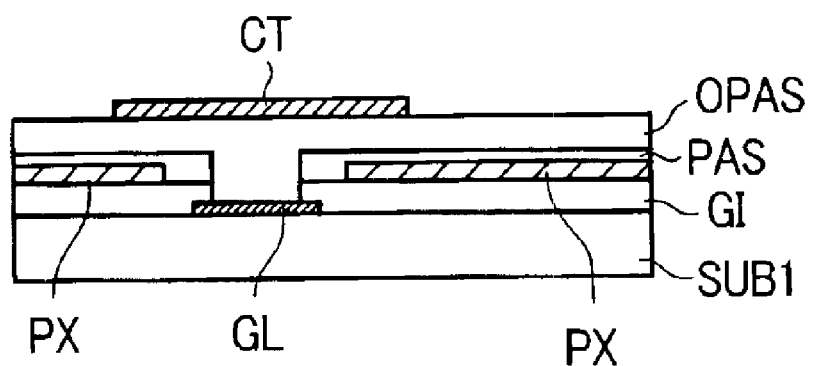
FIG. 3 is a cross-sectional diagram showing the structure of another embodiment of the pixel of the liquid crystal display device in accordance with the invention.

FIG. 3 is a diagram showing another embodiment of the liquid crystal display device in accordance with the invention, showing a cross-section corresponding to FIG. 1C.

The main difference over the arrangement of FIG. 1C lies in the fact that, at a portion between a counter electrode CT and a gate signal line GL, where an opening is defined in the protective film PAS, a hole is formed also in the underlying dielectric film GI so that the OPAS fills the hole to the surface of the gate signal line GL, which is exposed therefrom. In the case of this arrangement, similar effects are obtainable.

In this case, SiN, which is the same as the material of the protective film PAS, may alternatively be used as the material of the dielectric film GI.

Embodiment 3

Figure 4:
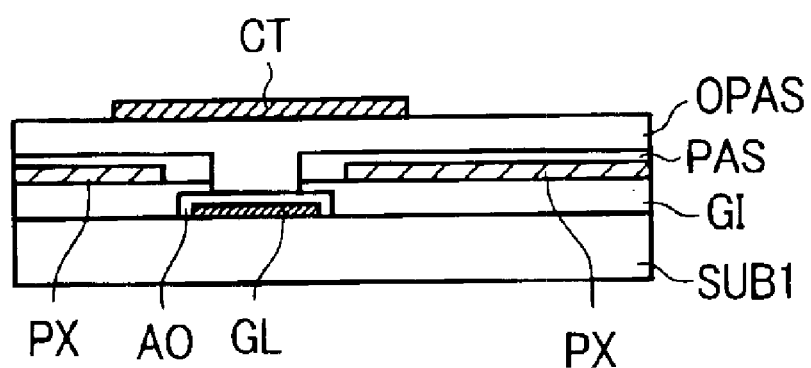
FIG. 4 is a sectional diagram showing the structure of another embodiment of the pixel of the liquid crystal display device in accordance with the invention.

FIG. 4 is a diagram showing another embodiment of the liquid crystal display device in accordance with the invention, also showing a cross-section corresponding to FIG. 1C.

This arrangement is different from that shown in FIG. 3 in that aluminum (Al) or tantalum (Ta) is used as the material of gate signal lines GL, which are structured so that an oxide film AO of $Al_2O_3$ or $Ta_2O_3$ is formed on its surface by anodization techniques. In the case of employing this structure, similar effects may also be obtained.

Embodiment 4

Figure 5A:
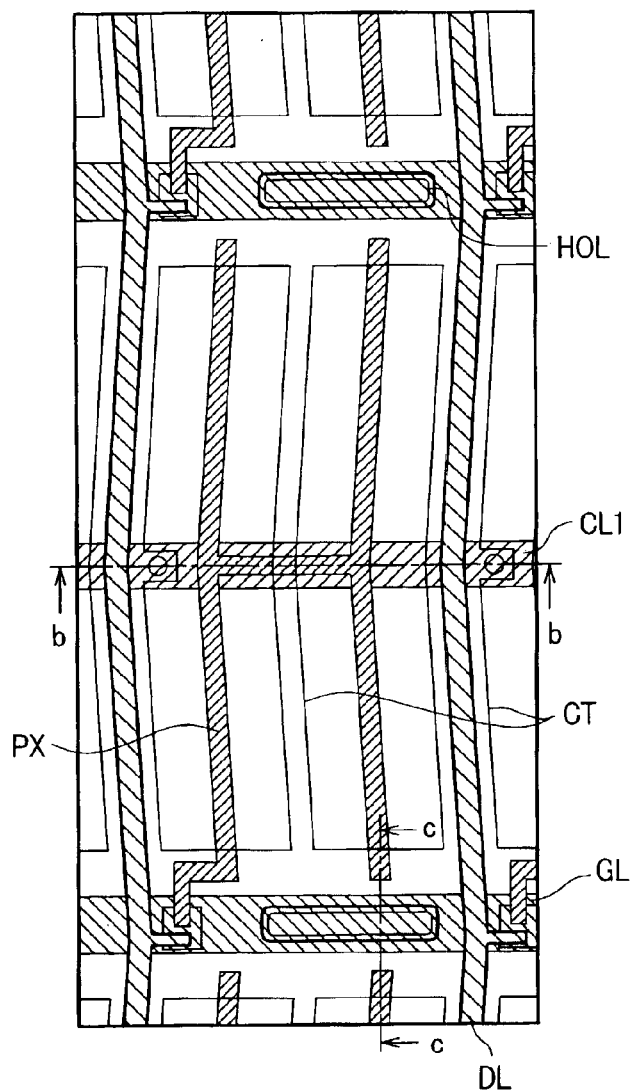
Figure 5B:
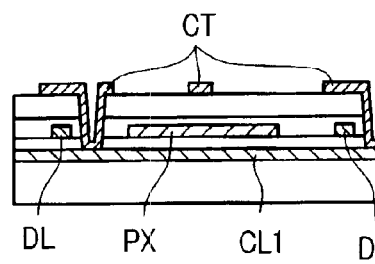
Figure 5C:
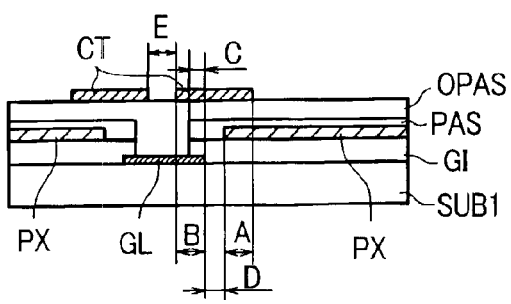

FIGS. 5A to 5C are diagrams showing yet another embodiment of the liquid crystal display device in accordance with the invention, which drawings correspond to the views shown in FIGS. 1A–1C, respectively.

The main difference in this arrangement from that shown in FIGS. 1A–1C is that, in the counter voltage signal line CL, which is formed to overlap the part at which a hole is defined in the protective film PAS, a hole HOL is formed within the region of the hole in the protective film layer therebelow so that the former hole is smaller in area than the latter.

In this case, as shown in FIG. 5C, when the width of the overlap of a pixel electrode PX and counter electrode CT is "A", the width of the overlap of a gate signal line GL and counter electrode CT is "B", the width of the overlap of a protective film PAS and gate signal line GL is "C", the width of the spacing between the gate signal line GL and pixel electrode PX is "D", the width of a hole in the counter voltage signal line is "E", and the width of a hole in the protective film PAS is "F", these values are set to be greater than zero (0).

The liquid crystal display device thus arranged in this way is capable of suppressing potential variations of the pixel electrode PX, because the formation of the hole HOL in the counter voltage signal line CL reduces the parasitic capacitance between it and the gate signal line GL associated therewith.

Also, it should be noted that, in the steady state, upon turning off a thin-film transistor TFT, the capacitance Csc at the width A of an overlap between the pixel electrode PX and counter voltage signal line CL functions as a capacitive element Cstg. If the counter voltage signal line CL is not formed, then a jumping voltage, occurring due to the gate signal line GL of pixel electrode PX, would increase.

In the steady state, when the thin-film transistor TFT turns off, it is possible to minimize variations of the gate signal line GL by way of the capacitance Cgc at the width B of the overlap between the gate signal line GL and counter electrode CT and also the capacitance Csc at the width A of the overlap between the pixel electrode PX and counter electrode CT. If no holes are formed in the counter voltage signal line CL, then a potential variation of the gate signal line GL results in the counter voltage signal line CL varying in potential, which in turn causes the pixel electrode PX to potentially vary due to the capacitance Csc.

Additionally, provision of the width C of the overlap between the protective film PAS and gate signal line GL is aimed at preclusion of electrolytic corrosion of the gate signal line GL by letting at least peripheral portions of the gate signal line GL be covered by or coated with the protective film PAS, in view of the fact that the electric field strength or intensity of the gate signal line GL can increase at the peripheral portions of the gate signal line GL due to the presence of the counter voltage signal line CL.

Further, an arrangement is employed which reduces the parasitic capacitance Cgs between the gate signal line GL and pixel electrode PX by means of the width D, by which the gate signal line GL and the pixel electrode PX are spaced apart from each other.

Embodiment 5

Figure 6A:
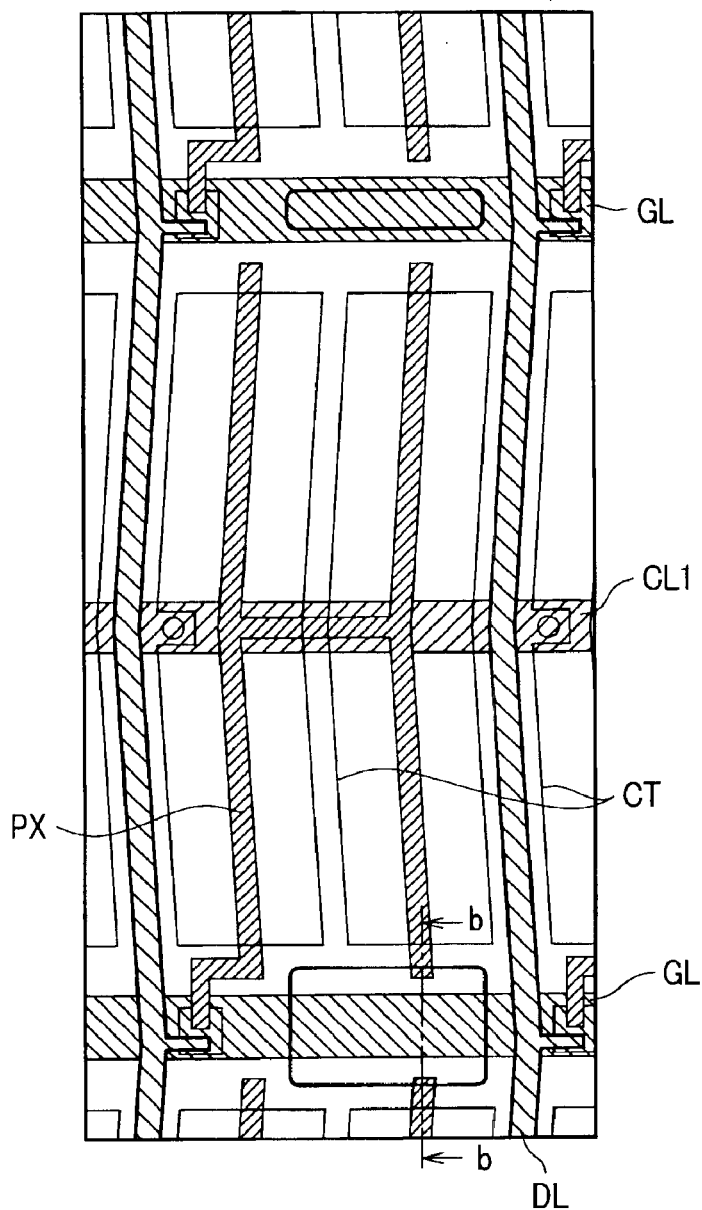
Figure 6B:
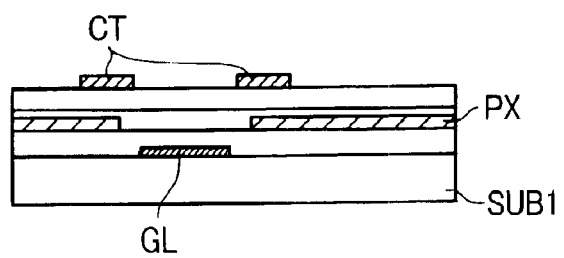

FIG. 6A is a diagram showing another embodiment of the liquid crystal display device in accordance with the invention, which drawing corresponds to the view shown in FIG. 5A. Additionally, FIG. 6B is a cross-sectional view taken along line b—b of FIG. 6A.

The difference in this arrangement from that of FIG. 5A is that the hole HOL, which is formed in the counter voltage signal line CL so as to overlap its associated gate signal line GL, is formed so that its width is greater than the width of the gate signal line GL.

With such an arrangement, it becomes possible to significantly reduce the parasitic capacitance between the gate signal line GL and the counter voltage signal line CL, which in turn makes it possible to reduce a waveform delay of the gate signal line GL.

Embodiment 6

Figure 7:
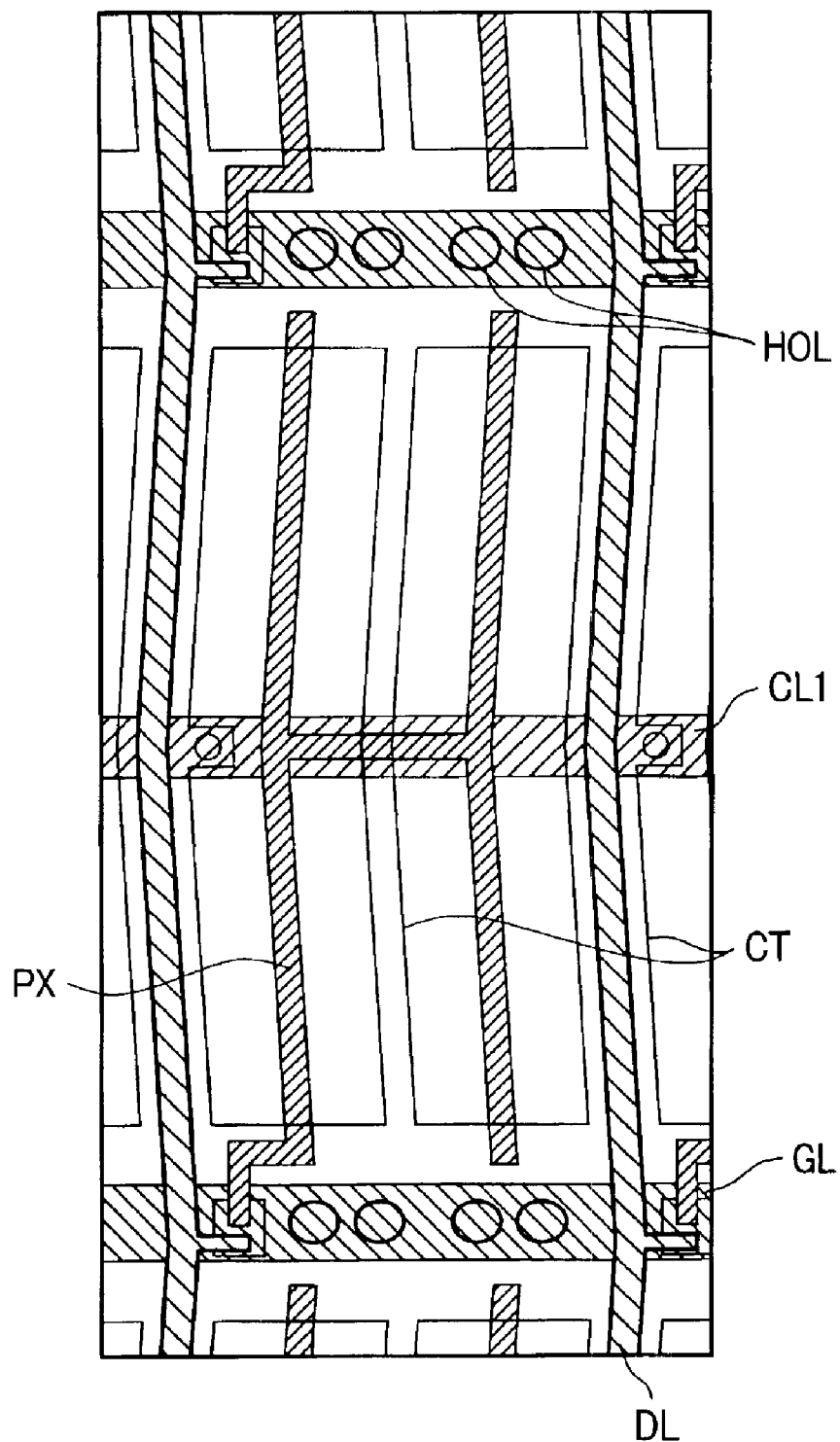
FIG. 7 is a diagram showing a plan view of another embodiment of the pixel of the liquid crystal display device in accordance with the invention.

FIG. 7 is a diagram showing another embodiment of the liquid crystal display device in accordance with the invention, which drawing corresponds to the view shown in FIG. 6A.

The difference in this arrangement from that of FIG. 6A is that the hole HOL, which is formed in the counter voltage signal line CL so as to overlap the gate signal line GL, is designed so that a plurality of holes are formed along the running direction of this gate signal line GL.

With such an arrangement, it is also possible to greatly reduce the parasitic capacitance between the gate signal line GL and the counter voltage signal line CL, which in turn makes it possible to reduce the waveform delay of the gate signal line GL.

Embodiment 7

Figure 8:
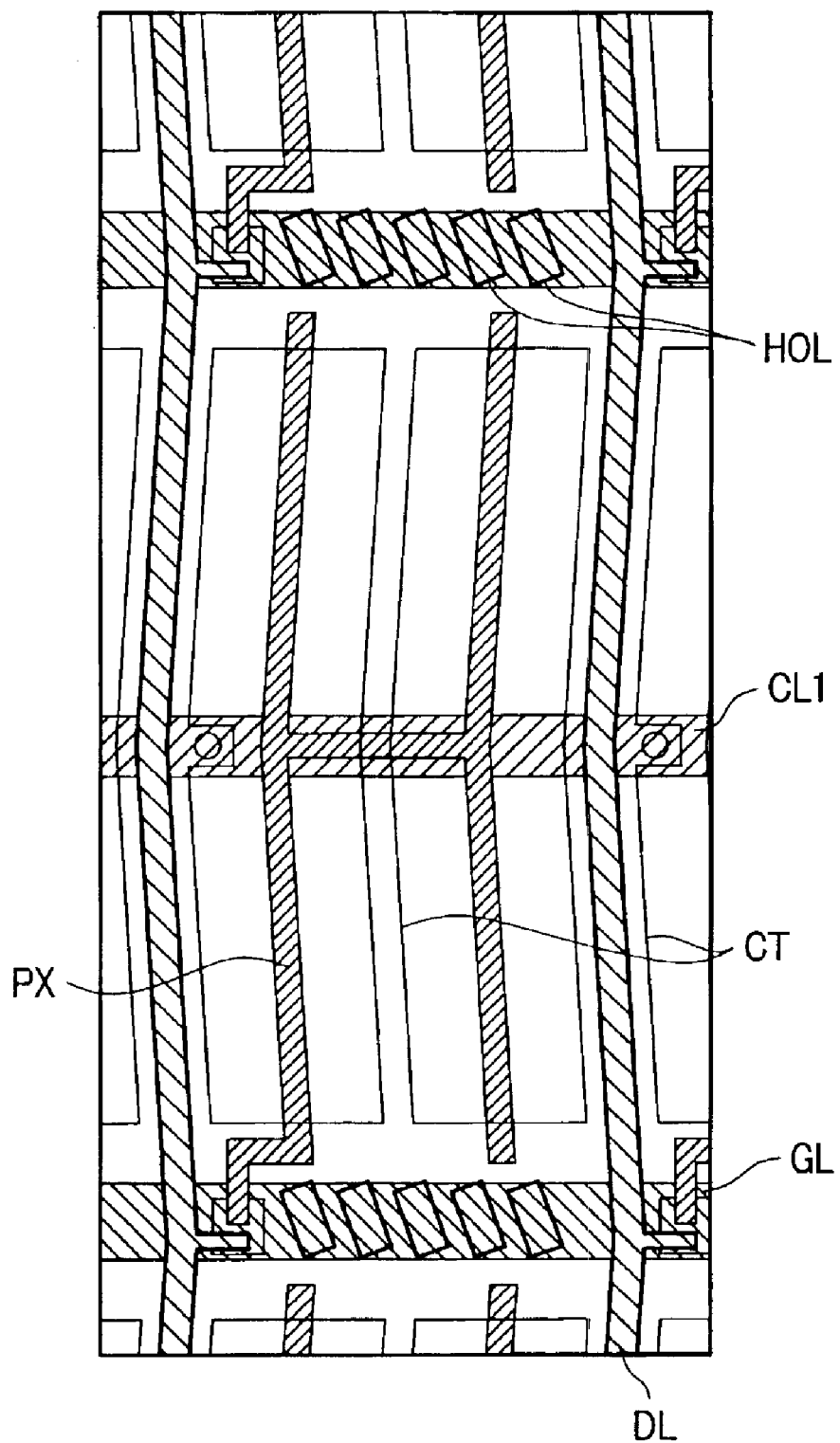
FIG. 8 is a diagram showing a plan view showing another embodiment of the pixel of the liquid crystal display device in accordance with the invention.

FIG. 8 is a diagram showing still another embodiment of the liquid crystal display device in accordance with the invention, which drawing corresponds to the view shown in FIG. 7.

In the embodiment of FIG. 7, although the holes HOL, which are formed in the counter voltage signal line CL so as to overlap the gate signal line GL, are provided such that each hole is patterned into a round or circular shape, a rectangular shaped pattern is used in FIG. 8, and each hole of rectangular shape is formed to have a little inclination or gradient with respect to the running direction of the gate signal line GL. This is provided in order to reduce the leakage of the electric field from the gate signal line GL to the pixel region side.

Embodiment 8

Figure 9A:
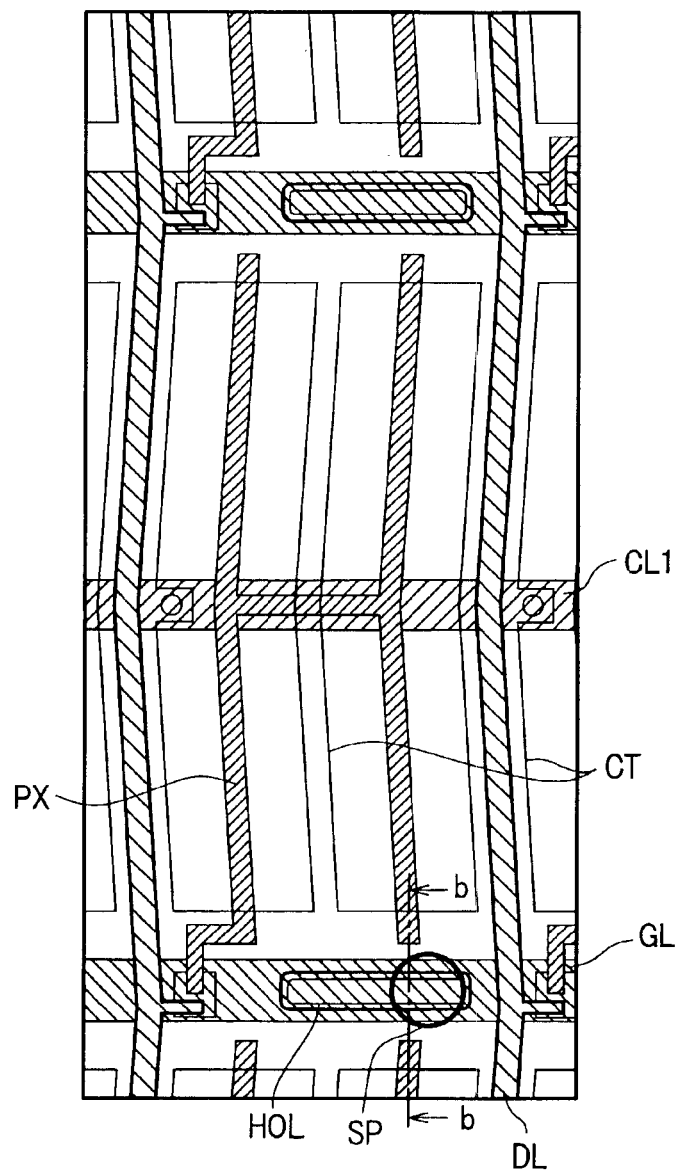
Figure 9B:
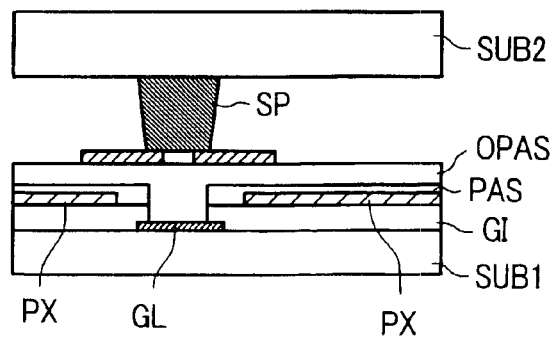

FIG. 9A is a diagram showing another embodiment of the liquid crystal display device in accordance with the invention, which drawing corresponds to the view shown in FIG. 5A. Additionally, a cross-sectional view taken along line b—b of FIG. 9A is shown in FIG. 9B.

In this embodiment, a spacer which maintains a gap between the transparent substrate SUB1 and transparent substrate SUB2 in the liquid crystal display unit AR is constituted from a spacer SP, which has a shape resembling a support rod or pillar. This support pillar-like spacer is formed on the transparent substrate SUB2 side, while at the same time its top portion is positioned at a portion of the hole HOL of the counter voltage signal line CL.

The pillar-like spacer SP is fabricated by selective etching processes using a photolithography technique as applied to a resin film, which is formed on the transparent substrate SUB2 side and which is made of acryl or polyimide or the like, wherein its relative dielectric constant is set to be smaller than that of the liquid crystals. Due to this, it becomes possible to further reduce the parasitic capacitance occurring between it and the drain signal line DL.

Embodiment 9

Figure 10:
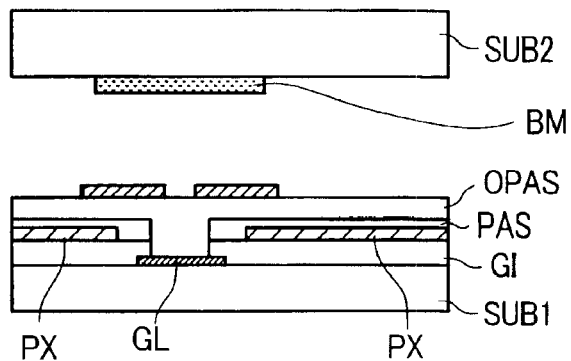
FIG. 10 is a sectional diagram showing still another embodiment of the pixel of the liquid crystal display device in accordance with the invention.

FIG. 10 is a diagram showing another embodiment of the liquid crystal display device in accordance with the invention, which drawing corresponds to the view shown in FIG. 9B.

On the liquid crystal-side surface of the transparent substrate SUB2, a black matrix BM is formed so that it overlaps at least the gate signal line GL. This black matrix EM is structured, for example, from a resin layer with its relative resistance of $10^8$ Ωcm or less, or alternatively from a metal layer. The metal layer may be made from Cr by way of example. In this case, by providing it with a stacked or multilayered structure of Cr and Cr-oxide makes it possible to reduce the reflection factor or "reflectivity."

With such an arrangement, it is possible to shield any leakage electric field from the gate signal line GL owing to the black matrix BM.

Figure 11:
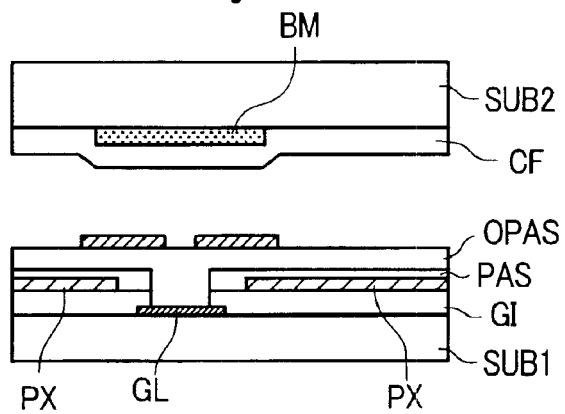
FIG. 11 is a sectional diagram showing yet another embodiment of the pixel of the liquid crystal display device in accordance with the invention.

Also, note that, in such an arrangement, further effects and advantages are achievable by forming, on or above the surface of the black matrix BM, a color filter CF or a planarization film (not shown) or the like, which is formed to overlie the black matrix BM also by use of low-resistance materials, as shown in FIG. 11.

Embodiment 10

Figure 12A:
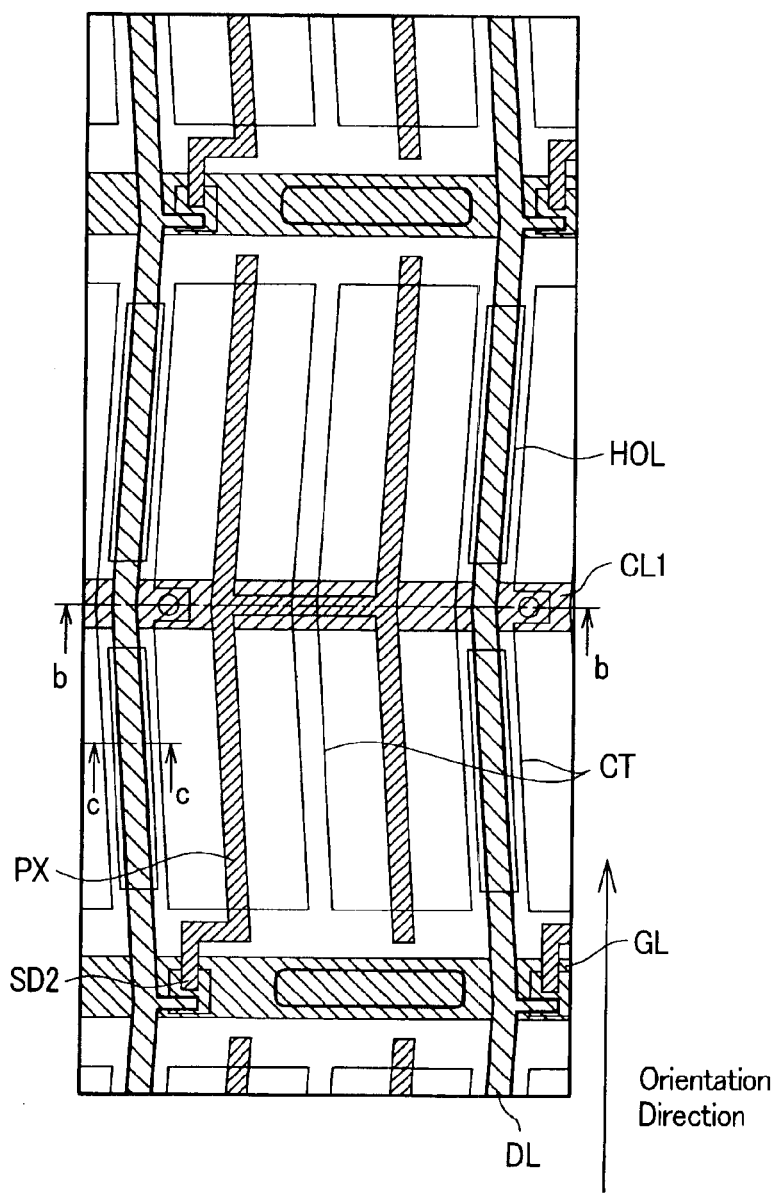
Figure 12B:
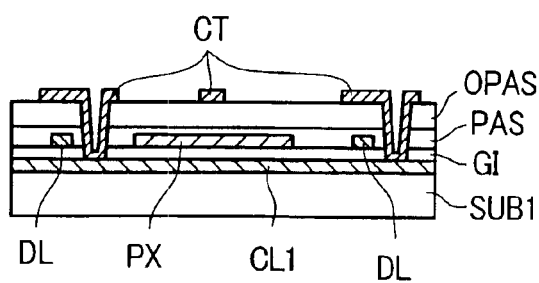
Figure 12C:
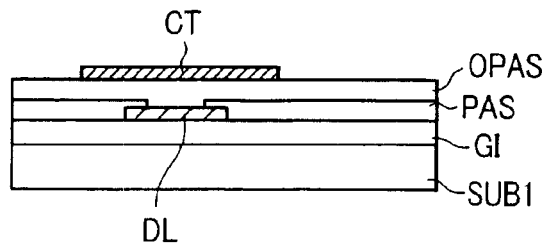

FIGS. 12A to 12C are diagrams showing another embodiment of the liquid crystal display device in accordance with the invention, which drawings correspond to the views shown in FIGS. 5A–5C, respectively.

The difference in this arrangement from that of FIGS. 5A–5C is that the plurality of holes formed in the protective film PAS are formed not only over the gate signal lines GL, but also over the drain signal lines DL.

Holes HOL1 to be formed in the protective film PAS, overlying a drain signal line DL, are formed along this drain signal line DL, while permitting exposure of a central portion, excluding each peripheral portion in parallel with the running direction of the drain signal line DL. Whereby, the protective film, which is interposed between the drain signal line DL and the counter electrode CT, becomes only a protective film OPAS formed of an organic material layer; thus, it is possible to reduce the parasitic capacitance formed between the drain signal line DL and counter electrode CT, which in turn makes it possible to suppress waveform delays of respective signals being supplied to the drain signal line DL and the counter electrode CT, respectively.

Embodiment 11

Figure 13:
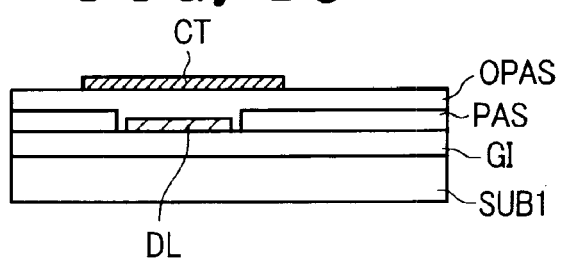
FIG. 13 is a sectional diagram showing another embodiment of the pixel of the liquid crystal display device in accordance with the invention.

FIG. 13 is a diagram showing another embodiment of the liquid crystal display device in accordance with the invention, which drawing corresponds to the view shown in FIG. 12C.

The difference in this arrangement from that of FIG. 12C lies in the fact that the holes HOL1 are defined in the protective film PAS, while the drain signal line DL is arranged so that its each peripheral portion, in parallel to the running direction of this line, also is exposed. In this case, it is desirable to use $SiO_2$ as the material of the dielectric film GI. This is because the hole-opening process of the protective film PAS results in the dielectric film GI having the function of a stopper.

Embodiment 12

Figure 14:
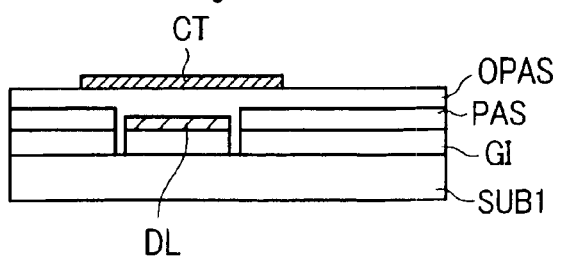
FIG. 14 is a sectional diagram showing another embodiment of the pixel of the liquid crystal display device in accordance with the invention.

FIG. 14 is a diagram showing a further embodiment of the liquid crystal display device in accordance with the invention, which drawing corresponds to the views shown in FIG. 13.

The difference in this arrangement from that of FIG. 13 is in the fact that the dielectric film GI is comprised of SiN, by way of example, and also in that this dielectric film GI is subjected to a hole-opening process, using the drain signal line DL as a mask, simultaneously during the hole-opening step of the protective film PAS.

Embodiment 13

Figure 15A:
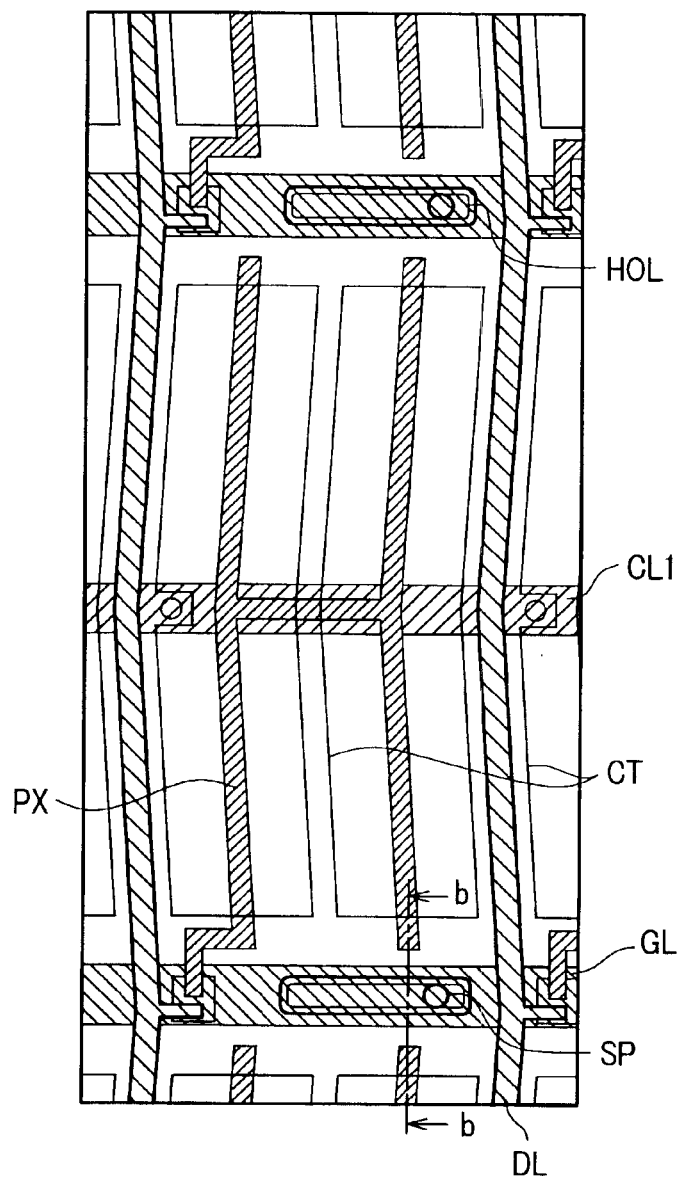
Figure 15B:
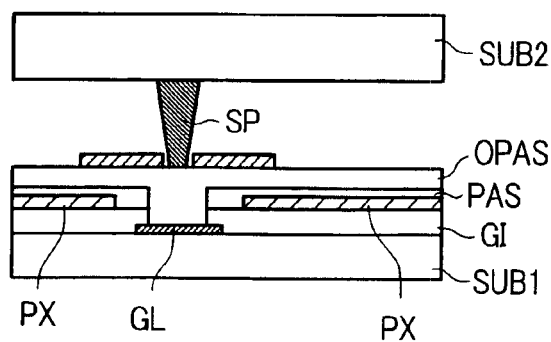

FIGS. 15A–15B are diagrams showing another embodiment of the liquid crystal display device in accordance with the invention, which drawings correspond to the views shown in FIGS. 9A–9B, respectively.

The difference in this arrangement from that of FIGS. 9A–9B is that the top portion of the support pillar-like spacer SP, as formed on the transparent substrate SUB2 side, is positioned within the hole HOL that was formed in the counter voltage signal line CL, to thereby guarantee that it does not come into direct contact with the counter voltage signal line CL.

With such an arrangement, it is possible to attain an effect in that wipe displacement hardly occurs upon adding a pressure in the horizontal direction of the display screen (during a wipe deviation test).

Embodiment 14

Figure 16A:
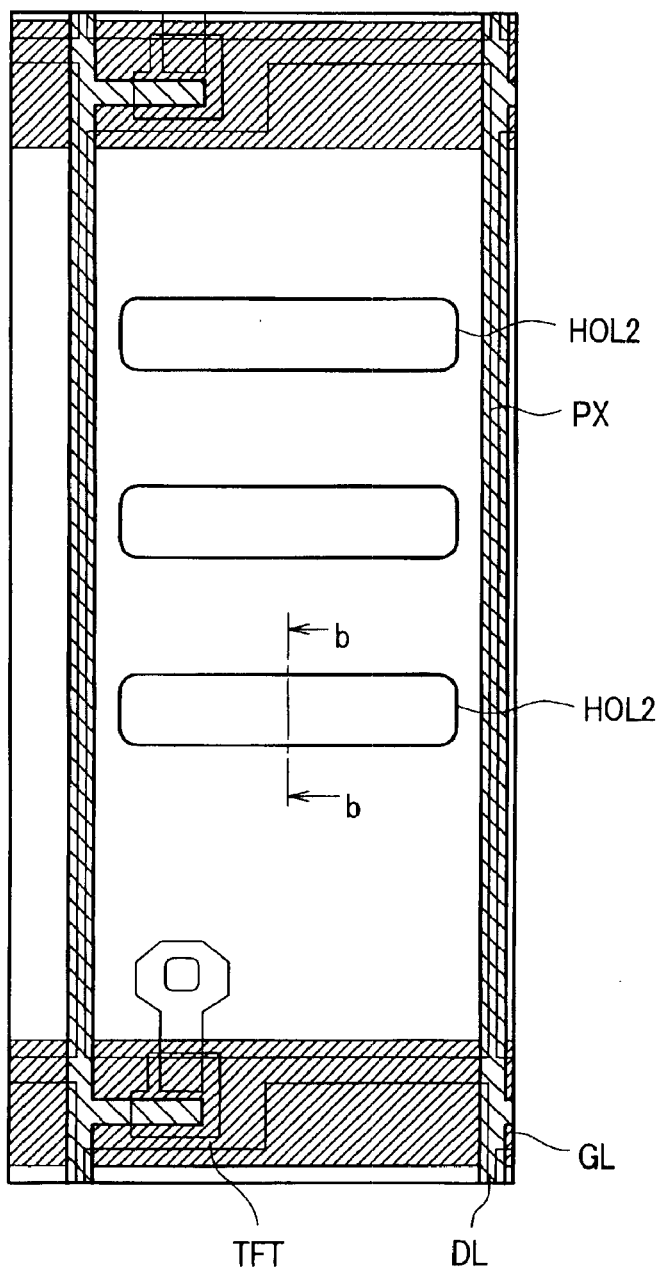

FIG. 16A is a diagram showing a plan view of yet another embodiment of the liquid crystal display device in accordance with the invention. In addition, FIG. 16B is a cross-sectional view taken along line b—b of FIG. 16A.

Figure 16B:
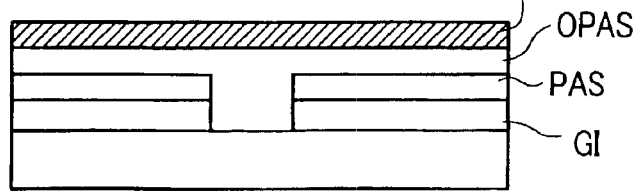

FIGS. 16A–16B show a pixel structure of the type using the so-called longitudinal electric field scheme. First, the difference in this arrangement from that of FIGS. 1A–1C lies in the pixel electrode PX. This pixel electrode PX is so formed as to cover the entire area of a pixel region on the surface of a sequential lamination body, which consists essentially of a protective film PAS, that is made of an inorganic material and is formed to also cover a thin-film transistor TFT, and a protective film OPAS, that is made of an organic material.

This pixel electrode PX is comprised of a transparent conductive film made, for example, of indium tin oxide (ITO), indium tin zincoxide (ITZO), indiumzincoxide (IZO), tinoxide ($SnO_2$), indium oxide ($In_2O_3$) or the like. A peripheral part of the pixel electrode PX is formed to overlap the drain signal line DL and gate signal line GL to thereby enable pixels to improve in aperture ratio.

A counter electrode, which causes an electric field to be generated between it and the pixel electrode PX, is constituted from a transparent conductive film, such as, for example, ITO or the like, which is formed on the liquid crystal-side surface of the other transparent substrate SUB2 in common to each pixel region. In this case, a plurality of holes HOL2 are formed and arranged in the protective film PAS, that is made of an inorganic material, within the pixel region and its underlying dielectric film GI. wherein each hole penetrates them.

In the case of employing this arrangement, the protective film OPAS, that is made of an organic material and is formed on the upper surface of the protective film PAS, is formed so that it is buried in the holes HOL2; thus, it is possible to prevent unwanted deviation of the protective film OPAS. This remedy becomes necessary in light of the fact that the protective film OPAS, that is made of an organic material, is formed such that a deviation due to thermal hysteresis can easily take place therein.

As apparent from the foregoing explanations, according to the liquid crystal display device of the present invention, it is possible to reduce waveform delays of scan signals to be supplied to the gate signal lines.

It is also possible to reduce waveform delays of image or video signals being supplied to the drain signal lines.

What is claimed is:

1. A liquid crystal display device comprising:
    a first substrate and a second substrate with a liquid crystal layer interposed therebetween;
    plurality of gate signal lines formed on the first substrate, and a plurality of drain signal lines formed on the first substrate so as to intersect with the plurality of gate signal lines, thereby to form pixel regions;
    a plurality of switching elements operable by a scan signal from a gate signal line, at least a pixel electrode to which an image signal is supplied through a switching element from a drain signal line in each pixel region, and at least a counter electrode for creating an electric field with the pixel electrode being provided in each pixel region;
    wherein at least one counter electrode is arranged along a running direction of a drain signal line and overlaps with the drain signal line, with a dielectric film being disposed therebetween, at least one counter electrode or counter voltage signal line being integrated with the counter electrode is arranged along a running direction of said gate signal line and overlaps with said gate signal line, with the dielectric film being disposed therebetween; and
    said dielectric film is comprised of a sequential lamination of at least a protective film made of an inorganic material and a protective film made of an organic material, wherein an opening is formed at part of said protective film made of the inorganic material in a region underlying at least either one of said counter voltage signal line and said counter electrode, the opening being filled with the protective film made of the organic material.

2. The liquid crystal display device according to claim 1, wherein at least an opening which has a smaller area than the opening formed at part of said protective film is formed in at least one of a counter voltage signal line or counter electrode overlying said protective film in the region in which the opening in said protective film is formed.

3. The liquid crystal display device according to claim 2, wherein the pixel electrode has a band-like pattern which is extended in the running direction of the drain signal line, and wherein one end of said pixel electrode being disposed adjacent to a hole formed in said counter voltage signal line is caused to overlap this counter voltage signal line and is spaced apart from the gate signal line.

4. The liquid crystal display device according to claim 2, wherein switching element is formed of a thin-film transistor, wherein a sequential lamination of a dielectric film for use as a gate insulation film of the thin-film transistor and a protective film made of an inorganic material plus a protective film made of an organic material is formed above a gate signal line, and wherein a hole to be formed in said protective film made of the inorganic material is formed to penetrate said dielectric film at its lower layer.

5. The liquid crystal display device according to claim 4, wherein a hole to be formed in said protective film made of the inorganic material and in the dielectric film is formed within the region of the gate signal line.

6. A liquid crystal display device comprising:
    a first substrate and a second substrate with a liquid crystal layer interposed therebetween;
    a plurality of gate signal lines formed on the first substrate, and a plurality of drain signal lines formed on the first substrate so as to intersect with the plurality of gate signal lines, thereby to form pixel regions;
    a plurality of switching elements operable by a scan signal from a gate signal line, at least a pixel electrode to which an image signal is supplied through a switching element from a drain signal line in each pixel regions, and at least a counter electrode for creating an electric field with the pixel electrode being provided in each pixel region;
    wherein at least one counter electrode is arranged along a running direction of a drain signal line and overlaps with the drain signal line, with a dielectric film being disposed therebetween, at least one counter electrode or counter voltage signal line being integrated with the counter electrode is arranged along a running direction of said gate signal line and overlap with said gate signal line, with the dielectric film being disposed therebetween; and
    said dielectric film is constituted from a sequential lamination of a first protective film and a second protective film, which overlaps said first protective film and is lower in dielectric constant than said first protective film, wherein an opening is formed at part of said first protective film underlying at least either one of said counter voltage signal and said counter electrode, said opening being filled with said second protective film.

7. The liquid crystal display device according to claim 6, wherein at least an opening, which has a smaller area than the opening formed at part of said protective film, is formed in at least one of a counter voltage signal line or counter electrode overlying said protective film in the region in which the opening in said protective film is formed.

8. The liquid crystal display device according to claim 7, wherein the pixel electrode has a band-like pattern which is extended in the running direction of the drain signal line, and wherein one end of said pixel electrode being disposed adjacent to a hole formed in said counter voltage signal line is caused to overlap this counter voltage signal line and is spaced apart from the gate signal line.

9. The liquid crystal display device according to claim 7, wherein each switching element is formed of a thin-film transistor, wherein a sequential lamination of a dielectric film for use as a gate insulation film of the thin-film transistor and a first protective film plus a second film is formed above a gate signal line, and wherein a hole to be formed in the first protective film is formed to penetrate its underlying dielectric film for also use as the gate insulation film.

10. The liquid crystal display device according to claim 9, wherein said first protective film and a hole to be formed in this protective film is formed within the gate signal line.

11. A liquid crystal display device comprising:
a first substrate and a second substrate with a liquid crystal layer interposed therebetween;
a plurality of gate signal lines formed on the first substrate, and a plurality of drain signal lines formed on the first substrate so as to intersect with the plurality of gate signal lines, thereby to form pixel regions;
a plurality of switching elements operable by a scan signal from a gate signal line, at least a pixel electrode to which an image signal is supplied through a switching element from a drain signal line in each pixel regions, and at least a counter electrode for creating an electric field with the pixel electrode be provided in each pixel region;
wherein at least one counter electrode is arranged along a running direction of a drain signal line and overlaps with the drain signal line, with a dielectric film being disposed therebetween, at least one counter electrode or counter voltage signal line being integrated with the counter electrode is arranged along a running direction of said gate signal line and overlaps with said gate signal line, with the dielectric film being disposed therebetween;
at least an opening is in one of said counter voltage signal line and the counter electrode, and said opening is arranged to partially overlap with the gate signal line.

12. The liquid crystal display device according to claim 11, further comprising support pillar-like spacer formed on or above the liquid crystal-side surface of the second substrate, wherein a top portion of a support pillar-like spacer is provided in such a way as to oppose said opening.

13. The liquid crystal display device according to claim 12, wherein said spacer is made of a material which is lower in dielectric constant than said liquid crystal.

14. The liquid crystal display device according to claim 11, wherein said dielectric film has a first protective film and a second protective film overlapping the first protective film, wherein a hole is formed in the first protective film within a region overlapping said hole, and wherein the hole of the first protective film is filled with the second protective film.

15. The liquid crystal display device according to claim 14, wherein said first protective film is an inorganic film and wherein said second protective film is an organic film.

16. The liquid crystal display device according to claim 14, wherein said second protective film is lower in dielectric constant than said first protective film.

17. The liquid crystal display device according to claim 11, further comprising a black matrix formed above the liquid crystal-side surface of the second substrate at least at a position opposing said opening, wherein this black matrix has a resistivity of $10^8$ Ωcm or less.

18. The liquid crystal display device according to claim 11, further comprising a black matrix formed above the liquid crystal-side surface of the second substrate at least at a position opposing said opening, wherein this black matrix includes at least a metal or metal-alloy material.

19. The liquid crystal display device according to claim 17, wherein said black matrix has a metal or metal-alloy.

20. The liquid crystal display device according to claim 18, wherein said black matrix contains therein chromium (Cr).

* * * * *